US012738790B2

(12) United States Patent
Yamaji et al.

(10) Patent No.: US 12,738,790 B2
(45) Date of Patent: Sep. 15, 2026

(54) STATOR FOR ROTARY ELECTRIC MACHINE

(71) Applicant: DENSO CORPORATION, Kariya-city (JP)

(72) Inventors: Manabu Yamaji, Kariya-city (JP); Nobuo Isogai, Kariya-city (JP); Atsuo Ishizuka, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 181 days.

(21) Appl. No.: 18/812,651

(22) Filed: Aug. 22, 2024

(65) Prior Publication Data

US 2025/0070608 A1 Feb. 27, 2025

(30) Foreign Application Priority Data

Aug. 24, 2023 (JP) ................................ 2023-136619
May 27, 2024 (JP) ................................ 2024-085400

(51) Int. Cl.
*H02K 3/30* (2006.01)
*H02K 3/28* (2006.01)
*H02K 3/32* (2006.01)
*H02K 3/34* (2006.01)
(Continued)

(52) U.S. Cl.
CPC ............... *H02K 3/28* (2013.01); *H02K 3/345* (2013.01)

(58) Field of Classification Search
CPC .. H02K 3/30; H02K 3/32; H02K 3/38; H02K 3/34; H02K 3/345; H02K 3/48; H02K 3/50; H02K 3/04; H02K 3/12; H02K 15/12; H02K 15/122; H02K 15/10; H02K 15/104; H02K 15/105; H01B 7/02; H01B 7/17
See application file for complete search history.

(56) References Cited

U.S. PATENT DOCUMENTS 6,222,295 B1 * 4/2001 Umeda .................... H02K 3/12 310/201
7,723,405 B2 * 5/2010 Braun ...................... C09D 7/65 528/38
(Continued)

FOREIGN PATENT DOCUMENTS

CN 111081413 A * 4/2020 ............... H02K 3/34
CN 111193335 A * 5/2020 ............... H02K 1/16
(Continued)

*Primary Examiner* — Edgardo San Martin
(74) *Attorney, Agent, or Firm* — Precision Patents, P.C.

(57) ABSTRACT

A stator includes: a stator core that is shaped in a tubular form and has a plurality of slots; and a plurality of conductor segments that are inserted into the slots and are electrically connected with each other to form a stator coil. Each conductor segment has: an electrical conductor that is shaped in a linear form; an electrical insulation film that covers a periphery of the electrical conductor; a plurality of capsules that are hollow and are dispersed inside the electrical insulation film; and a bend that forms a bent-back shape on the conductor segment at an end portion of the stator core which faces in an axial direction. Among the plurality of capsules, capsules located at an outer periphery of the bend and capsules located at an inner periphery of the bend are respectively shaped in an ellipsoid form at each of the plurality of conductor segments.

8 Claims, 14 Drawing Sheets

(51) Int. Cl.
*H02K 15/10* (2025.01)
*H02K 15/104* (2025.01)

(56) References Cited

U.S. PATENT DOCUMENTS

| | | | | |
|---|---|---|---|---|
| 8,448,334 | B2 * | 5/2013 | Perry | H02K 3/30 29/33 F |
| 8,981,613 | B2 * | 3/2015 | Ikuta | H02K 3/38 310/43 |
| 9,550,855 | B2 * | 1/2017 | Benkoski | C09D 163/00 |
| 10,658,884 | B2 * | 5/2020 | Honjo | H02K 1/04 |
| 10,777,335 | B2 * | 9/2020 | Nakano | H02K 3/30 |
| 10,832,829 | B2 * | 11/2020 | Ota | C08J 9/26 |
| 11,283,320 | B2 * | 3/2022 | Kaneko | H02K 3/30 |
| 11,450,450 | B2 * | 9/2022 | Hara | H01B 3/421 |
| 12,080,448 | B2 * | 9/2024 | Nishi | H01B 7/0225 |
| 12,100,532 | B2 * | 9/2024 | Ushiwata | H01B 19/04 |
| 2014/0339948 | A1 | 11/2014 | Matsuoka | |
| 2019/0020239 | A1 | 1/2019 | Tsujimori et al. | |
| 2019/0089218 | A1 * | 3/2019 | Azusawa | H02K 3/345 |
| 2020/0091790 | A1 | 3/2020 | Kaneko et al. | |
| 2020/0135360 | A1 * | 4/2020 | Maeda | H01B 3/308 |
| 2021/0083539 | A1 | 3/2021 | Maruyama et al. | |

FOREIGN PATENT DOCUMENTS

| | | | | | |
|---|---|---|---|---|---|
| JP | 2009-011151 A | | 1/2009 | |
| JP | 2017-34883 A | | 2/2017 | |
| JP | 2019103174 A | * | 6/2019 | |
| JP | 2020064800 A | * | 4/2020 | H02K 3/30 |

* cited by examiner

FIG. 15

STATOR FOR ROTARY ELECTRIC MACHINE

CROSS REFERENCE TO RELATED APPLICATION

This application is based on and incorporates herein by reference Japanese Patent Application No. 2023-136619 filed on Aug. 24, 2023 and Japanese Patent Application No. 2024-85400 filed on May 27, 2024.

TECHNICAL FIELD

The present disclosure relates to a stator for a rotary electric machine.

BACKGROUND

For example, in a previously proposed segment conductor type stator, at one end of a stator core, which faces in an axial direction, coil segments of a stator coil are arranged as follows. That is, each of spanning portions of the coil segments spans from a radially inner portion of one of slots of the stator core to a radially outer portion of another one of the slots. The spanning portions are arranged continuously in a circumferential direction, and each circumferentially adjacent two of the spanning portions partially overlap with each other in a view taken in the axial direction. Apex portions of the spanning portions are twisted to form a crossed state in a view taken in a radial direction. A portion of each spanning portion, which is located on a radially outer side of the apex portion, is radially outwardly bulged. With the configuration described above, interference between the coil segments (conductor segments) at a coil end portion can be avoided, and thereby the height of the spanning portions can be limited.

In the stator described above, the apex portions of the spanning portions are twisted and thereby bulged toward the radially outer side of the stator. Thus, a length of respective electrical conductors of the coil segments, which form the stator coil, is increased, resulting in an increase in the conduction loss.

SUMMARY

This section provides a general summary of the disclosure, and is not a comprehensive disclosure of its full scope or all of its features.

According to the present disclosure, there is provided a stator for a rotary electric machine. The stator includes a stator core and a plurality of conductor segments. The stator core is shaped in a tubular form and has a plurality of slots. The plurality of conductor segments are inserted into the plurality of slots and are electrically connected with each other to form a stator coil. Each of the plurality of conductor segments has an electrical conductor, an electrical insulation film, a plurality of capsules and a bend. The electrical conductor is shaped in a linear form. The electrical insulation film covers a periphery of the electrical conductor. The plurality of capsules are hollow and are dispersed inside the electrical insulation film. The bend forms a bent-back shape on the conductor segment at an end portion of the stator core which faces in an axial direction. Among the plurality of capsules, capsules located at an outer periphery of the bend and capsules located at an inner periphery of the bend are respectively shaped in an ellipsoid form at each of the plurality of conductor segments.

BRIEF DESCRIPTION OF DRAWINGS

The drawings described herein are for illustrative purposes only of selected embodiments and not all possible implementations, and are not intended to limit the scope of the present disclosure.

FIG. 15 is an enlarged view showing a radius of curvature of the bend of the comparative example and a radius of curvature of the bend of the embodiment.

DETAILED DESCRIPTION

Figure 1:
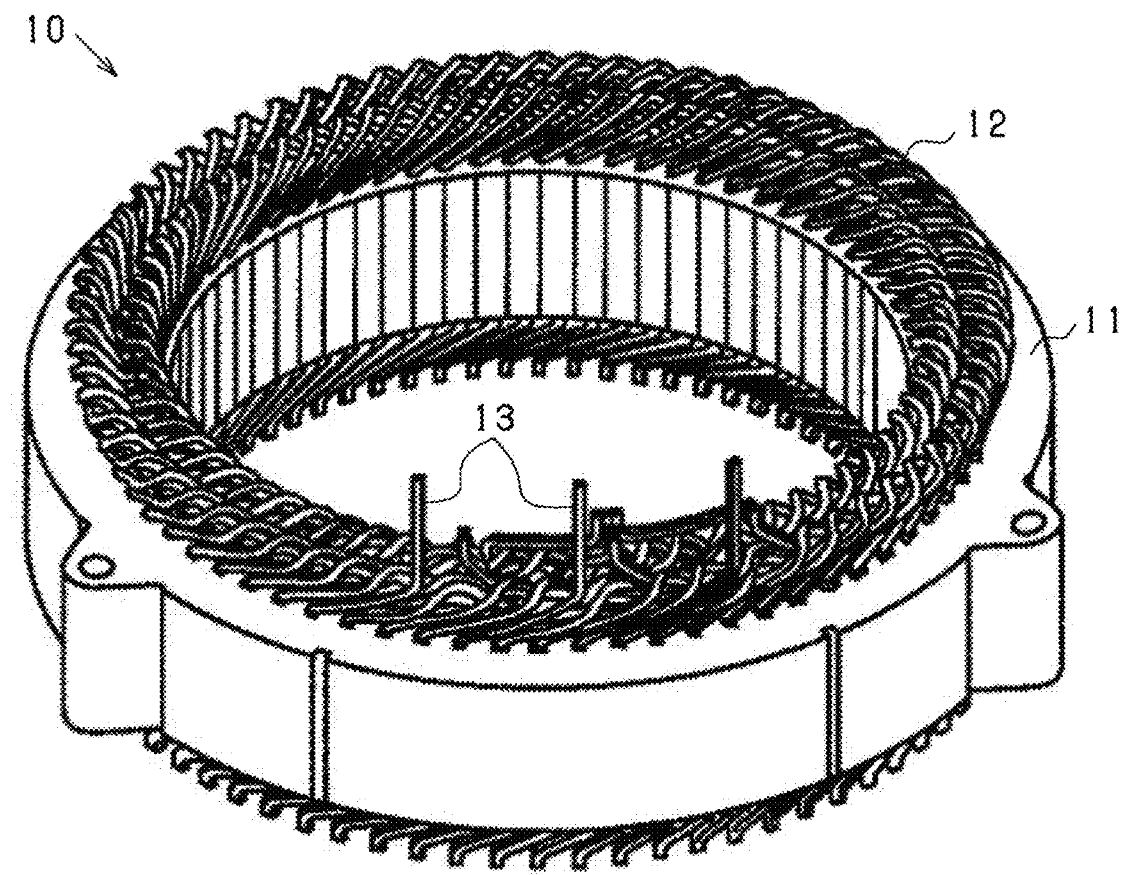
FIG. 1 is a perspective view of a stator of an embodiment of the present disclosure.

For example, in a previously proposed segment conductor type stator, at one end of a stator core, which faces in an axial direction, coil segments of a stator coil are arranged as follows. That is, each of spanning portions of the coil segments spans from a radially inner portion of one of slots of the stator core to a radially outer portion of another one of the slots. The spanning portions are arranged continuously in a circumferential direction, and each circumferentially adjacent two of the spanning portions partially overlap with each other in a view taken in the axial direction. Apex portions of the spanning portions are twisted to form a crossed state in a view taken in a radial direction. A portion of each spanning portion, which is located on a radially outer side of the apex portion, is radially outwardly bulged. With the configuration described above, interference between the coil segments (conductor segments) at a coil end portion can be avoided, and thereby the height of the spanning portions can be limited.

In the stator described above, the apex portions of the spanning portions are twisted and thereby bulged toward the radially outer side of the stator. Thus, a length of respective electrical conductors of the coil segments, which form the stator coil, is increased, resulting in an increase in the conduction loss.

According to a first aspect of the present disclosure, there is provided a stator for a rotary electric machine, including:

a stator core that is shaped in a tubular form and has a plurality of slots; and a plurality of conductor segments that are inserted into the plurality of slots and are electrically connected with each other to form a stator coil, wherein:

each of the plurality of conductor segments has:

an electrical conductor that is shaped in a linear form;

an electrical insulation film that covers a periphery of the electrical conductor;

a plurality of capsules that are hollow and are dispersed inside the electrical insulation film; and a bend that forms a bent-back shape on the conductor segment at an end portion of the stator core which faces in an axial direction; and among the plurality of capsules, capsules located at an outer periphery of the bend and capsules located at an inner periphery of the bend are respectively shaped in an ellipsoid form at each of the plurality of conductor segments.

With the configuration described above, the stator core shaped in the tubular form has the plurality of slots. The plurality of conductor segments are inserted into the plurality of slots and are electrically connected with each other to form the stator coil. Therefore, the height of the conductor segments at the axial end portion of the stator core, i.e., the height of the coil end portion can be limited to shorten the length of the respective conductor segments and limit the conduction loss.

Here, each of the plurality of conductor segments has the bend that forms the bent-back shape on the conductor segment at the end portion of the stator core which faces in the axial direction. Therefore, by reducing the radius of curvature of the bend, the height of the coil end portion can be limited. However, when the radius of curvature of the bend is reduced, the electrical insulation film may be stretched at the outer periphery of the bend, possibly causing the generation of a crack in the electrical insulation film. The crack may then propagate through use of the rotary electric machine, and the insulation of the stator coil may deteriorate.

With respect to this point, each of the plurality of conductor segments has the plurality of capsules which are hollow and are dispersed inside the electrical insulation film. Thus, even if the crack is generated in the electrical insulation film at the outer periphery of the bend, the capsule(s) can be stretched or torn in response to the crack reaching the capsule(s), and thereby the stress in the electrical insulation film can be relieved. Thus, the propagation of the crack generated at the electrical insulation film can be limited. Furthermore, the capsules located at the outer periphery and the inner periphery of the bend are respectively shaped in the ellipsoid form. This allows the crack in the electrical insulation film to cross the capsule(s) more easily than the spherical capsule(s) of the same volume. Therefore, in comparison to a case where the spherical capsules are dispersed inside the electrical insulation film at the outer periphery of the bend, it is possible to more effectively limit the propagation of the crack in the electrical insulation film. As a result, since the radius of curvature of the bend can be reduced, the height of the coil end portion of the stator coil can be limited, and thus the conduction loss of the stator coil can be limited.

According to a second aspect, at each of the plurality of conductor segments, a major-diameter direction of each of the capsules located at the outer periphery of the bend is along a circumferential direction of the outer periphery of the bend. The configuration described above makes it easier for the crack generated at the outer periphery of the bend to cross the major diameter of the capsule at the time of propagating toward the radially inner side of the bend. Thus, the propagation of the crack generated at the outer periphery of the bend can be limited.

According to a third aspect, at each of the plurality of conductor segments, a major-diameter direction of each of the capsules located at the inner periphery of the bend is along a direction perpendicular to a circumferential direction of the outer periphery of the bend. According to the configuration described above, at the inner periphery of the bend, a minor diameter direction of each of the capsules (i.e., a direction along which a minor diameter of the capsule formed in the ellipsoid form is measured) is along the circumferential direction of the inner periphery of the bend. Thus, at the inner periphery of the bend, the length of the capsule, which is measured in the circumferential direction of the bend, can be reduced, and thereby the radius of curvature of the bend can be further reduced easily.

According to a fourth aspect of the present disclosure, at each of the plurality of conductor segments, a volume of each of the capsules located at the inner periphery of the bend is smaller than a volume of each of the capsules located at the outer periphery of the bend. The configuration described above makes it easier for the crack to cross the capsule(s) at the outer periphery of the bend, and it is possible to further reduce the radius of curvature of the bend at the inner periphery of the bend. Furthermore, the configuration described above can be produced through, for example, stretching of the outer periphery of the bend in the circumferential direction and compressing of the inner periphery of the bend in the circumferential direction at the time of forming the bend at the conductor segment. Therefore, the configuration described above can be easily manufactured through the processing of the bend.

According to a fifth aspect of the present disclosure, the electrical insulation film is made of polyimide at each of the plurality of conductor segments; each of the plurality of conductor segments is fixed to the stator core by varnish at an inside of a corresponding one of the plurality of slots; and among the plurality of capsules, capsules placed at a surface of the electrical insulation film are covered by the polyimide at each of the plurality of conductor segments.

In the configuration described above, the electrical insulation film is made of the polyimide, and the conductor segment is fixed to the stator core by the varnish at the inside of the slot. Since the adhesiveness between the polyimide and the varnish is relatively strong, the conductor segment can be stably fixed to the stator core by the varnish if the polyimide is in contact with the varnish. Here, the capsules may possibly be located at the surface of the electrical insulation film. In such a case, if the adhesiveness between the capsules and the varnish is weak, the fixation of the conductor segment by the varnish to the stator core may possibly be weakened. In this regard, the capsules, which are located at the surface of the electrical insulation film, are covered by the polyimide. Therefore, the conductor segment can be stably fixed to the stator core by the varnish.

According to a sixth aspect of the present disclosure, the electrical insulation film is made of polyimide at each of the plurality of conductor segments; each of the plurality of conductor segments has an exposed portion of the electrical conductor, which is exposed from the electrical insulation film at an end portion of each of the plurality of conductor segments, and the exposed portions of each corresponding two of the plurality of conductor segments are welded together to form a welded portion; the welded portion and an adjacent portion of the electrical insulation film, which is placed adjacent to the welded portion at each corresponding two of the plurality of conductor segments, are powder-coated; and among the plurality of capsules, capsules placed at a surface of the electrical insulation film are covered by the polyimide at each of the plurality of conductor segments.

In the configuration described above, the electrical insulation film is made of the polyimide, and the welded portion and the portion of the electrical insulation film adjacent to the welded portion are powder coated. Since the adhesiveness between the polyimide and the powder coating is good, if the polyimide is in contact with the powder coating, the portion of the electrical insulation film adjacent to the welded portion can be powder coated in a stable manner. Here, the capsules may possibly be located at the surface of the electrical insulation film. In such a case, if the adhesiveness between the capsules and the powder coating is weak, the degree of adhesion of the powder coating to the portion of the electrical insulation film adjacent to the welded portion may possibly be weakened. In this regard, the capsules, which are located at the surface of the electrical insulation film, are covered by the polyimide. Therefore, the portion of the electrical insulation film adjacent to the welded portion can be powder coated in a stable manner.

According to a seventh aspect of the present disclosure, one inserting portion of each of adjacent two of the plurality of conductor segments, which are placed adjacent to each other, is inserted into a common slot among the plurality of slots, and another inserting portion of one of the adjacent two of the plurality of conductor segments and another inserting portion of another one of the adjacent two of the plurality of conductor segments are inserted into two different slots, respectively, among the plurality of slots; each of the plurality of conductor segments has an apex portion, which is bent separately from the bend; a radius of curvature of the inner periphery of the bend is equal to or smaller than 3.5 mm; and a radius of curvature of an inner periphery of the apex portion is equal to or smaller than 2.0 mm.

According to the configuration described above, the one inserting portion of each of the adjacent two of the plurality of conductor segments is inserted into the common slot among the plurality of slots, and the another inserting portion of the one of the adjacent two of the plurality of conductor segments and the another inserting portion of the another one of the adjacent two of the plurality of conductor segments are inserted into the two different slots, respectively, among the plurality of slots. Therefore, in comparison to another configuration where the adjacent two conductor segments have the one inserting portions inserted into the common slot and the other inserting portions inserted into the common slot, the height of the coil end portion tends to become high to avoid interference between the conductor segments. In this regard, since the radius of curvature of the inner periphery of the bend is set to be equal to or smaller than 3.5 mm, the height of the coil end portion can be limited. Furthermore, even in such a case, the capsules described above can limit the further propagation of the crack generated at the electrical insulation film.

At the outer periphery of the bent portion of the conductor segment, the electrical insulation film is stretched, making the electrical insulation film thinner and also making the electrical insulation film more susceptible to cracking. Therefore, the dielectric strength of the outer periphery of the bent portion of the conductor segment is likely to decrease.

With respect to this point, according an eighth aspect of the present disclosure, each of the plurality of conductor segments has a bent portion that is bent separately from the bend, and an outer periphery of the bent portion of each of the plurality of conductor segments is out of contact with and is spaced from an adjacent one of the plurality of conductor segments, which is placed adjacent to the outer periphery of the bent portion, by a distance that is longer than one half of a thickness of the electrical conductor of each of the plurality of conductor segments. According to the configuration described above, the insulation of the stator coil can be further improved because it is easier to maintain the insulation distance between the outer periphery of the bent portion of the conductor segment and the other conductor segment.

Hereinafter, one embodiment, in which the present disclosure is implemented as a stator of a rotary electric machine, will be described. Among the following embodiment and modifications thereof, portions, which are the same or equivalent to each other, will be indicated by the same reference signs, and redundant description of these portions are omitted for the sake of simplicity. In the present embodiment, an electric motor, which serves as the rotary electric machine, is used as an electric motor for a vehicle or an electric motor for an aircraft.

The rotary electric machine of the present embodiment is applicable to, for example, a permanent magnet synchronous motor as well as a wound field motor and an induction machine and is a rotary electric machine having three-phase coils. The rotary electric machine includes: a stator 10 that is shown in FIG. 1 and is shaped in a cylindrical tubular form; and a rotor (not shown) that is placed on a radially inner side of the stator 10. The rotor (rotor) is rotatable about a rotational axis relative to the stator 10. Hereinafter, an axial direction refers to an axial direction of the stator 10, i.e., an axial direction of the rotational axis of the rotor, and a radial direction refers to a radial direction of the stator 10, i.e., a direction passing through the rotational axis and perpendicular to the rotational axis. Furthermore, a circumferential direction refers to a circumferential direction of the stator 10, i.e., a circumferential direction around the rotational axis of the rotor.

Figure 2:
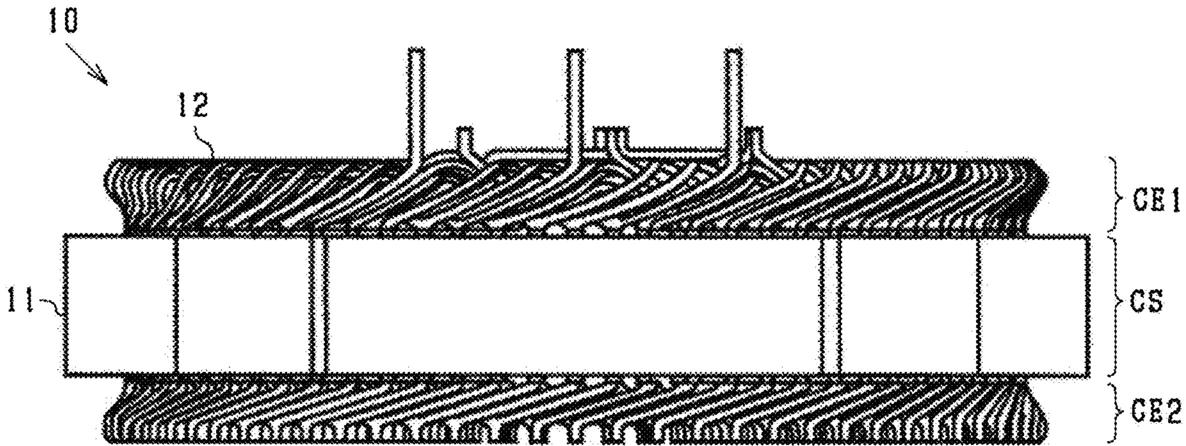
FIG. 2 is a front view of the stator.

As shown in FIGS. 1 and 2, the stator 10 includes: a stator core 11 that is shaped in a circular ring form (a cylindrical tubular form, a tubular form); and a plurality of stator coils 12 (stator windings) that are wound around the stator core 11. The rotary electric machine of the present embodiment is an inner rotor type rotary electric machine, and the rotor is rotatably placed on the radially inner side of the stator 10. The stator coils 12 are 3-phase coils including U-phase coils, V-phase coils, and W-phase coils as a plurality of phase coils (phase windings) each of which is provided for a corresponding one of three phases. Furthermore, a corresponding power line busbar 13 (power line connecting line) is connected to one end of a corresponding one of the phase coils, and a corresponding neutral line busbar (neutral line connecting line) is connected to the other end of the corresponding one of the phase coils. A range of each stator coil 12, which overlaps the stator core 11 in the axial direction, is defined as an intra-slot coil portion CS, and two opposite ranges of each stator coil 12, which are respectively located on two opposite sides in the axial direction and are placed axially outer side of the stator core 11, are respectively defined as a coil end portion CE1 and a coil end portion CE2. The rotary electric machine may be an outer rotor type or an axial gap type.

Figure 3:
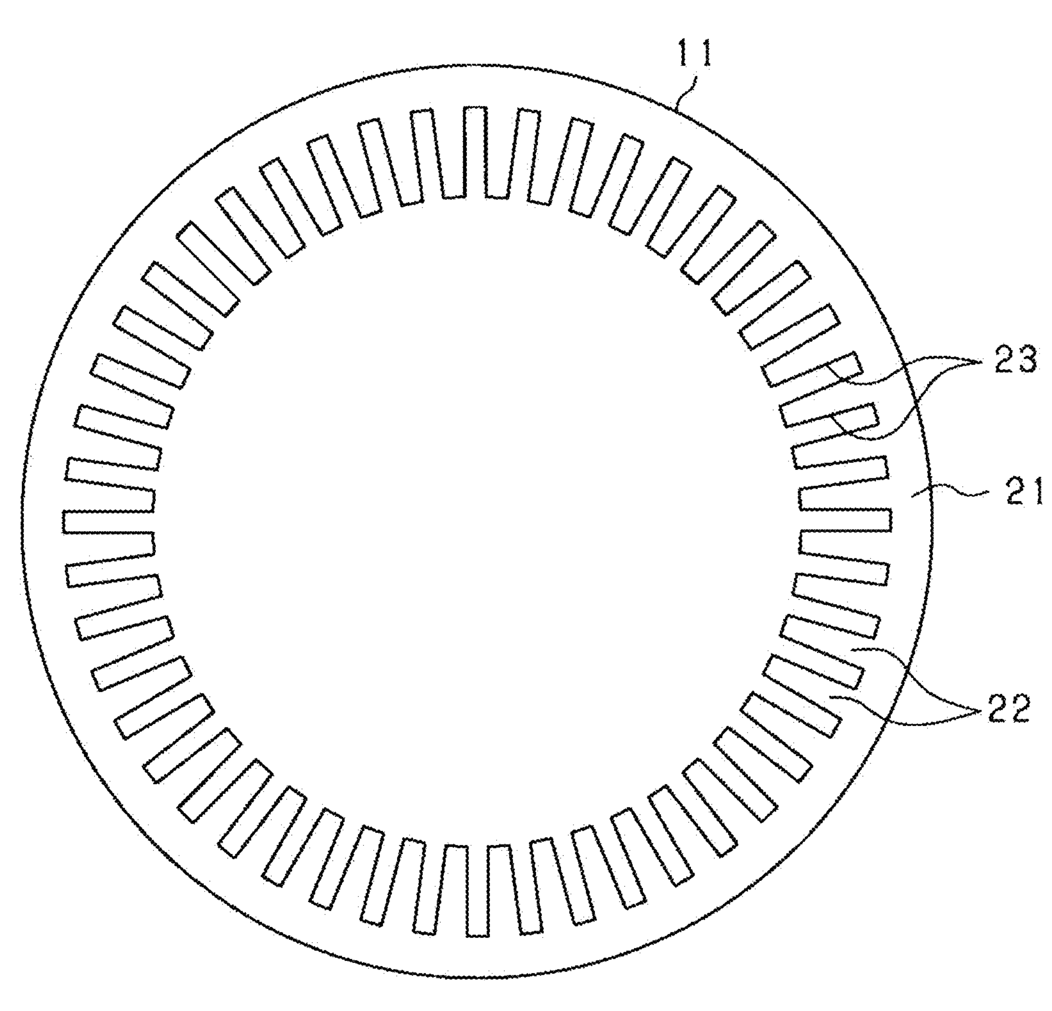
FIG. 3 is a plan view of a stator core.

As shown in FIG. 3, the stator core 11 includes: a back yoke 21 which is shaped in a circular ring form; and a plurality of teeth 22 which radially inwardly project from the back yoke 21 and are arranged at predetermined intervals in the circumferential direction. Each of the slots 23 is formed between corresponding adjacent two of the teeth 22. Each of the slots 23 is shaped such that an opening of the slot 23 is elongated in a longitudinal direction thereof that coincides with the radial direction of the stator core 11, and the slots 23 are arranged at equal intervals in the circumferential direction at the stator core 11. The stator coils 12 are installed in a state where the stator coils 12 are wound to the slots 23. The stator core 11 is formed as a core sheet laminated body that includes a plurality of core sheets which are electrical steel sheets made of a magnetic material and are stacked in the axial direction.

The stator coils 12 are formed such that the three-phase windings are connected by a Y-connection (a star connection). The three-phase coils may be connected by, for example, a delta connection. When an electric power (AC power) is supplied from an electric power source to the stator coils 12 through an inverter (not shown), a magnetic flux is generated. Each stator coil 12 is formed by a plurality of conductor segments 30. Each conductor segment 30 (coil segment) is a segmented conductor formed by shaping an electrical conductor 36, which has a substantially rectangular cross section (flat rectangular cross-section) and a constant thickness, into a generally U-shape. Hereinafter, a segment structure of the stator coils 12 will be described in detail.

Figure 4:
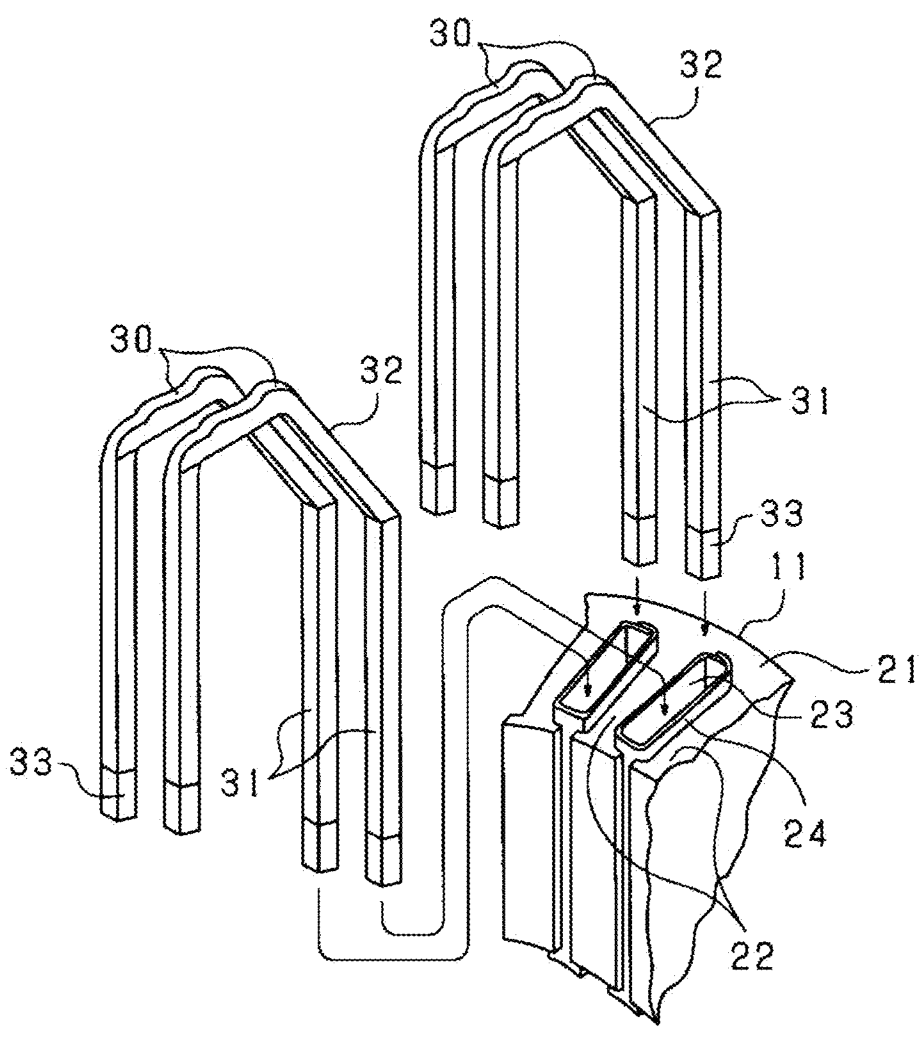
FIG. 4 is a perspective view showing conductor segments and a portion of the stator core.

FIG. 4 is a perspective view showing the conductor segments 30 and a portion of the stator core 11. As shown in FIG. 4, each conductor segment 30 is generally shaped in a U-shape and includes: a pair of straight portions 31 respectively shaped in a straight shape; and a turn portion 32 which is bent to join between the pair of straight portions 31. Each of the pair of straight portions 31 (serving as a pair of inserting portions) has a length that is longer than a thickness of the stator core 11 measured in the axial direction. The conductor segment 30 is formed by a flat rectangular conductor wire having a rectangular transverse cross-section (a conductor having a pair of opposed flat surfaces) covered with an electrical insulation film. The electrical insulation film is made of polyimide. A distal end portion of each straight portion 31 forms a conductor-exposed portion (or simply referred to as an exposed portion) 33, at which the electrical insulation film is removed to expose the electrical conductor 36.

Among the plurality of conductor segments 30, corresponding conductor segments 30 are inserted into each of the slots 23 of the stator core 11 such that these conductor segments 30 are arranged in line in the radial direction in the slot 23. In the present embodiment, the corresponding conductor segments 30 are received in each slot 23 in a stacked state where the corresponding straight portions 31 of the conductor segments 30 are stacked in four layers in the slot 23. The pair of straight portions 31 of each conductor segment 30 are respectively received in corresponding two slots 23 which are spaced from each other by a predetermined coil pitch. A portion of each straight portion 31, which is received in the corresponding slot 23, corresponds to the intra-slot coil portion CS of the stator coil 12. An electrical insulation sheet 24, which electrically insulates between the stator core 11 and the stator coils 12 (the conductor segments 30), is inserted into each of the slots 23. The electrical insulation sheet 24 is folded so as to collectively surround the conductor segments 30 inserted into the slot 23, and the electrical insulation sheet 24 is held between an inner peripheral surface (inner wall surface) of the stator core 11 and the conductor segments 30 in the slot 23. By impregnating the electrical insulation sheet 24 with varnish and allowing it to cure, the conductor segments 30 are fixed to the stator core 11 by the varnish inside the slot 23.

The pair of straight portions 31 of each conductor segment 30 are respectively received in the corresponding two slots 23 such that a radial position of one of the pair of straight portions 31 is displaced from the other one of the pair of straight portions 31. For example, when one of the pair of straight portions 31 is received at an nth position from a radially outermost position (back yoke side), the other one of the pair of straight portions 31 is received at an n+1 position from the radially outermost position. The pairs of straight portions 31 of each adjacent two of the plurality of conductor segments 30, which are adjacent to each other in the radial direction, are arranged as follows. That is, one of the straight portions 31 of each of the adjacent two conductor segments 30 is inserted into a common slot 23 among the plurality of slots 23, and the other one of the straight portions 31 of one of the adjacent two conductor segments 30 and the other one of the straight portions 31 of the other one of the adjacent two conductor segments 30 are inserted in two different slots 23, respectively, among the plurality of slots 23. For each of the conductor segments, which respectively function as a radially outermost crossover wire and a radially innermost crossover wire, in a case where one of the straight portions 31 is received at an nth position from a radially outermost position, the other one of the straight portions 31 is also received at the nth position from the radially outermost position.

At the time of inserting each conductor segment 30 into the corresponding slots 23 of the stator core 11, the straight portions 31 of each conductor segment 30 are inserted from a first end of the stator core 20 among the first and second ends of the stator core 20 which are opposite to each other in the axial direction, and the distal end portions of the straight portions 31 project from the second end of the stator core 11. In this case, the turn portion 32 of the conductor segment 30 forms the first coil end portion CE1 at the first end of the stator core 11. Furthermore, at the second end of the stator core 11, a part of each straight portion 31, which is opposite to the turn portion 32, is bent in the circumferential direction, and the straight portions 31 of the different conductor segments 30 are joined to form the second coil end portion CE2. Each coil end portion CE1, CE2 (coil ends) is formed as schematically indicated in FIG. 2. Next, a connection of the conductor segments 30 at the coil end portion CE2 will be described in more detail.

Figure 5A:
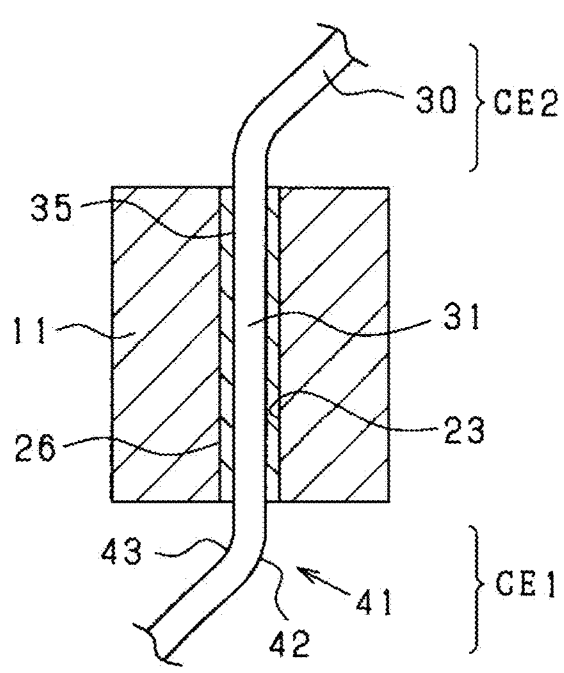
FIG. 5A is a partial cross-sectional view showing a portion of the conductor segment received in a slot.
Figure 5B:
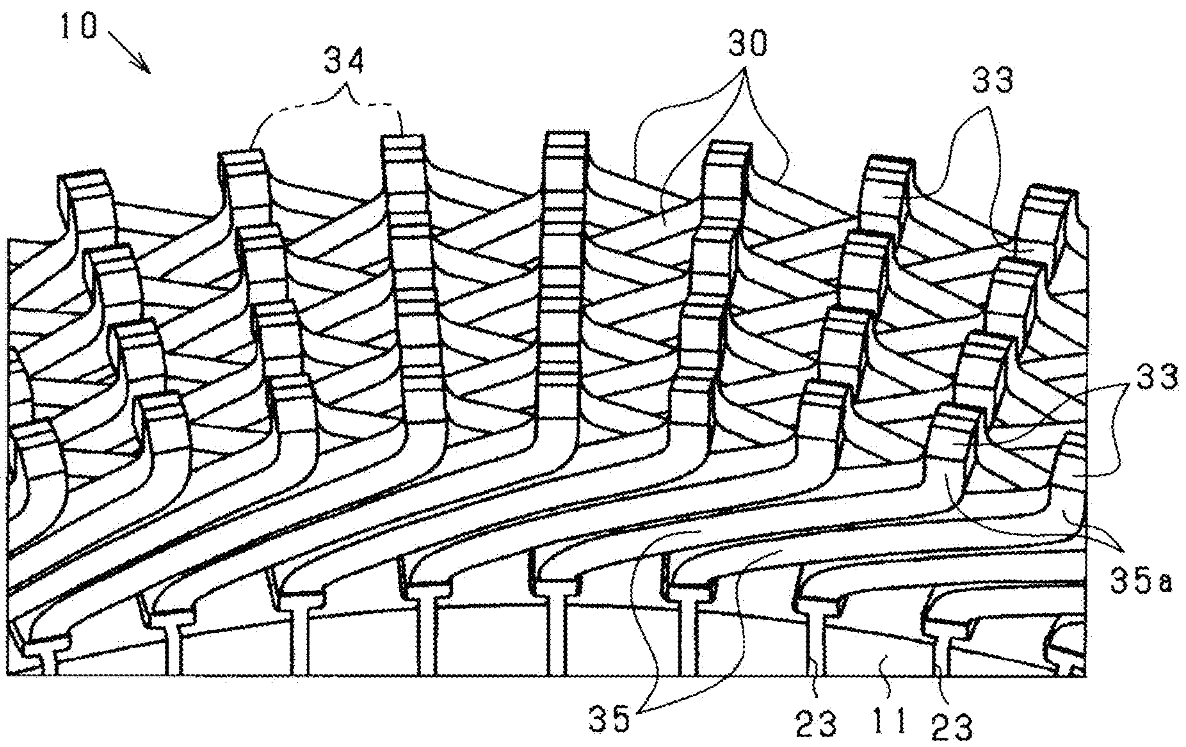
FIG. 5B is an enlarged perspective view showing welded portions of the conductor segments.

FIG. 5A is a partial cross-sectional view showing a portion of the conductor segment 30 received in the slot 23. At each conductor segment 30, a portion of each of the pair of straight portions 31, which is opposite to the turn portion 32, projects from the axial end surface (the upper end surface shown in FIG. 5A) of the stator core 11 and is bent to tilt in the circumferential direction at a predetermined angle relative to the core end surface. Then, as shown in FIG. 5B, which shows the coil end portion CE2 in an enlarged scale, the exposed conductor portions 33, which are formed at the distal end portions of each corresponding two of the conductor segments 30, are joined together by welding, and thereby these two conductor segments 30 are connected (electrically connected) with each other. The joint portion, at which the exposed conductor portions 33 are joined together by the welding, becomes a welded portion 34. The welded portion 34 and an adjacent portion 35*a* of the electrical insulation film 35, which is placed adjacent to the welded portion 34 at each corresponding two conductor segments 30, are powder-coated through a powder-coating process. Specifically, a dry powder is sprayed to cover the welded portions 34 and the adjacent portions 35*a* of the electrical insulation films 35 of the corresponding two conductor segments 30, and then the sprayed powder is melted with a high temperature and then solidified to form a coating film (not shown).

At the coil end portion CE2, at the location outside of the stator core 11 in the axial direction, a circumferential distal end portion of one of the conductor segments 30, which extends toward one side in the circumferential direction, and a circumferential distal end portion of the other one of the conductor segments 30, which extends toward the other side in the circumferential direction, are joined together. As a result, the stator coil 12 is held in a state where the straight portion 31 of the one conductor segment 30 is bent to extend in the corresponding direction tilted to the axial direction at the coil end portion CE2 and is bent back at a predetermined peak position by joining with the straight portion 31 of the other conductor segment 30. The conductor segments 30 include: conductor segments 30 in each of which the portion of each straight portion 31 opposite to the turn portion 32 is bent toward the same side that is the same as the bending side of the turn portion 32 in the circumferential direction; and the conductor segments 30 in each of which the portion of each straight portion 31 opposite to the turn portion 32 is bent toward the opposite side that is opposite to the bending side of the turn portion 32 in the circumferential direction.

At the phase coil for each phase, the conductor segments 30 are joined together at an intermediate portion of the phase coil, and the power line busbar 13 is connected to the exposed conductor portion 33 of one of the coil end portions of the phase coil, and the neutral line busbar is connected to the exposed conductor portion 33 of the other one of the coil end portions.

Here, as shown in FIG. 5A, the conductor segment 30 has a bend 41 that forms a bent-back shape on the conductor segment 30 at the end portion of the stator core 11 which faces in the axial direction. The smaller the radius of curvature of the bend 41, the more the height of the coil end portion CE1 can be limited. When the height of the coil end portion CE1 is reduced, the length of the turn portion 32 can be shortened to reduce the conduction loss of the stator coil 12. However, when the radius of curvature of the bend 41 is made small, the electrical insulation film 35 at an outer periphery 42 of the bend 41 will easily crack at the time of forming the bend 41 through a press work of the conductor segment 30 or at the time of using the rotary electric machine. This is because the smaller the radius of curvature of the bend 41, the greater the circumferential tensile stress applied on the electrical insulation film 35 at the outer periphery 42.

Figure 6:
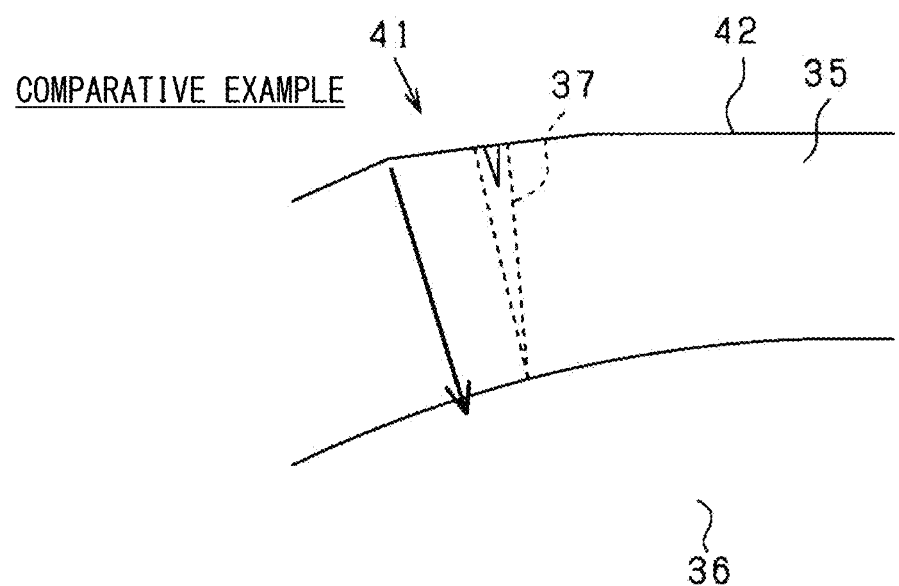
FIG. 6 is a schematic diagram showing a state of propagation of a crack of an electrical insulation film in a comparative example.

FIG. 6 is a schematic diagram showing a state of propagation of a crack 37 of the electrical insulation film 35 in a comparative example. When the crack 37 is generated at an outer peripheral surface of the electrical insulation film 35 at the outer periphery 42 of the bend 41, the crack 37 propagates toward the inner side of the bend 41 in the radial direction, as indicated by an arrow. The stress of the electrical insulation film 35 is not relieved even when the crack 37 propagates, so the crack 37 will propagate to the electrical conductor 36. The electrical conductor 36 is made of oxygen-free copper, aluminum, tough pitch copper or the like.

Figure 7:
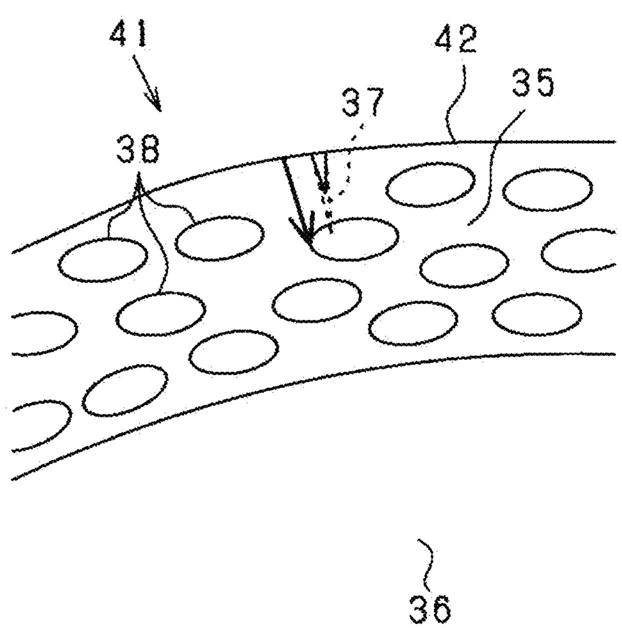
FIG. 7 is a schematic diagram showing a state of limiting propagation of a crack of an electrical insulation film by capsules.

In the present embodiment, as shown in FIG. 7, the conductor segment 30 has a plurality of capsules 38 which are hollow and are dispersed inside the electrical insulation film 35. The capsules 38 are made of resin, such as silicone, and are respectively shaped in, for example, a hollow spherical form or a hollow ellipsoid form. When the crack 37 is generated at an outer peripheral surface of the electrical insulation film 35 at the outer periphery 42 of the bend 41, the crack 37 propagates toward the inner side of the bend 41 in the radial direction, as indicated by an arrow. However, when the crack 37 propagates, the crack 37 reaches the capsule 38, which is located at a distal end of the crack 37, and the capsule 38 is stretched or torn. This relieves the stress on the electrical insulation film 35, and the crack 37 stops at the capsule 38 before the crack 37 propagates to the electrical conductor 36.

The shape of the capsule 38 varies depending on the location of the conductor segment 30.

Figure 8:
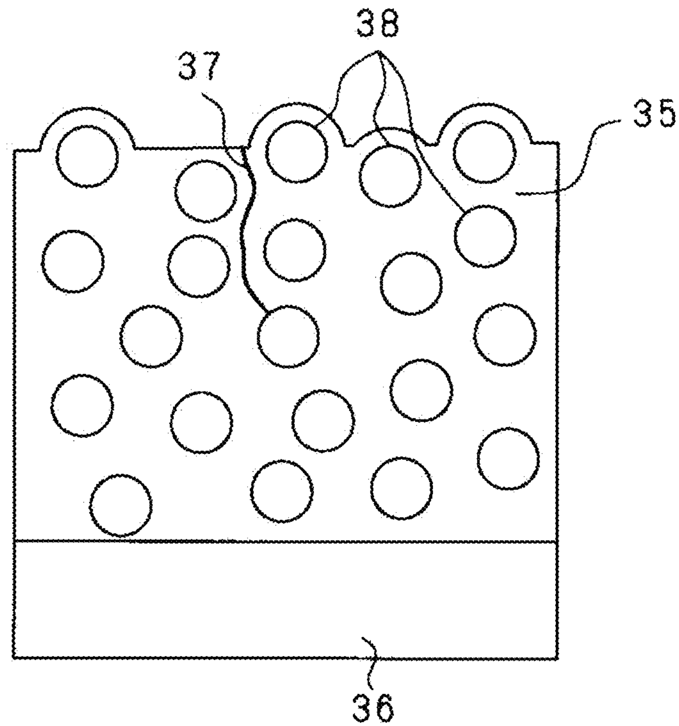
FIG. 8 is a schematic diagram showing a state of limiting propagation of a crack of an electrical insulation film by capsules respectively shaped in a spherical form.

At the straight portions 31 and straight portions of the turn portion 32, the capsules 38 contained in the electrical insulation film 35 are respectively shaped in the spherical form, as shown in FIG. 8. In this case, the crack 37 could reach the capsule 38 after propagating between the capsules 38.

Figure 9:
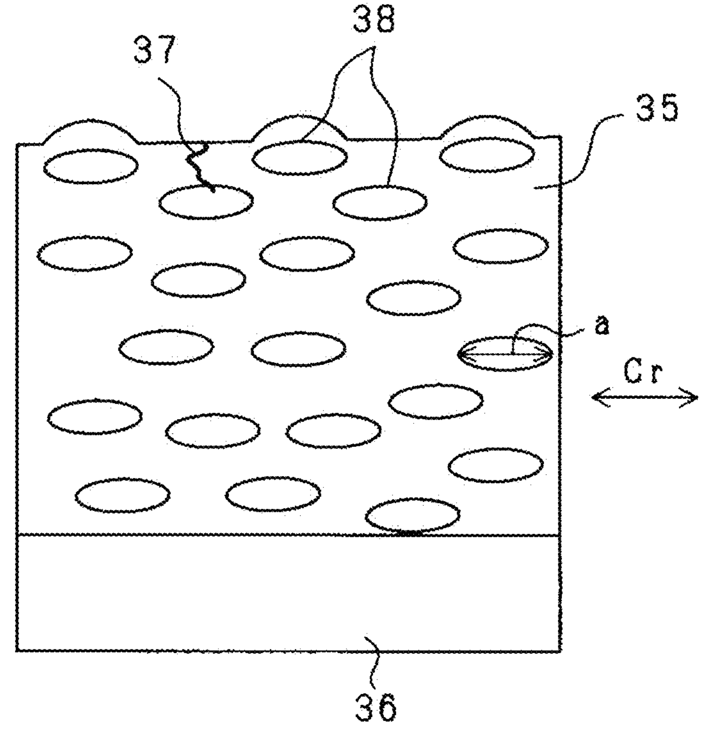
FIG. 9 is a schematic diagram showing a state of limiting propagation of a crack of an electrical insulation film by capsules respectively shaped in an ellipsoid form.

At, for example, the outer periphery 42 of the bend 41, the capsules 38 contained in the electrical insulation film 35 are respectively shaped in the ellipsoid form, as shown in FIG. 9. Here, a direction, along which a major diameter a of the capsule 38 formed in the ellipsoid form is measured, is defined as a major-diameter direction. The major-diameter direction is also referred to as an axial direction of a major axis of the capsule 38 formed in the ellipsoid form. The major-diameter direction of each of the capsules 38 located at the outer periphery 42 of the bend 41 is along (is substantially parallel to) a circumferential direction Cr of the outer periphery 42 of the bend 41. In this case, the crack 37 is less likely to propagate between the capsules 38, and the crack 37 is more likely to reach the capsule 38 closer to the outer peripheral surface of the electrical insulation film 35.

Figure 10:
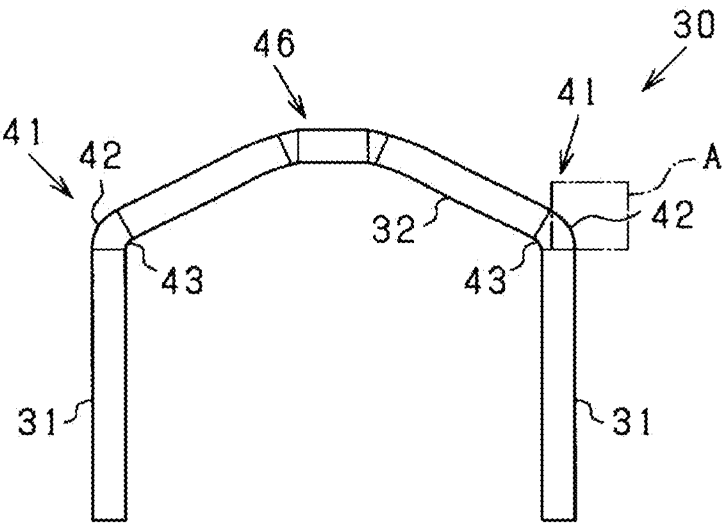
FIG. 10 is a front view of the conductor segment.
Figure 11:
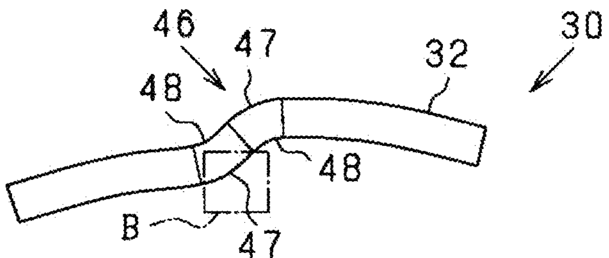
FIG. 11 is a plan view of the conductor segment.

FIG. 10 is a front view of the conductor segment 30, and FIG. 11 is a plan view of the conductor segment 30. As shown in FIG. 11, the turn portion 32 of the conductor segment 30 has an apex portion 46 that is bent in a crank shape ("S"-shape). The apex portion (also referred to as a bent portion) 46 has two outer peripheries 47 and two inner peripheries 48. A minimum value of a radius of curvature of the inner periphery 43 of the bend 41 is equal to or smaller than 3.5 mm. A minimum value of a radius of curvature of the inner periphery 48 of the apex portion 46 is equal to or smaller than 2.0 mm. This minimum value of the radius of curvature of the inner periphery 48 of the apex portion 46 may be set to be, for example, equal to or larger than 1.5 mm but equal to or smaller than 2.0 mm. The radius of curvature of the inner periphery 43 of the bend 41 may be set to be equal to or smaller than 3.0 mm or set to be equal to or larger than 3.0 mm but equal to or smaller than 4.0 mm, or may be set to be larger than 4.0 mm. The radius of curvature of the inner periphery 48 of the apex portion 46 may be set to be equal to or smaller than 1.5 mm or set to be equal to or larger than 1.5 mm but equal to or smaller than 2.5 mm, or may be set to be larger than 2.5 mm.

Figure 12:
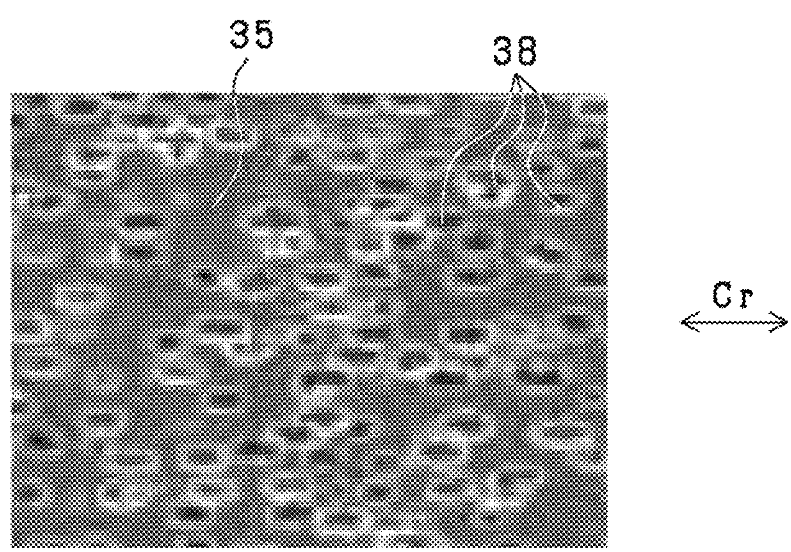
FIG. 12 is a cross-sectional photograph image showing capsules located at an outer periphery of a bend.

FIG. 12 is a cross-sectional photograph image showing the capsules 38 located at the outer periphery of the bend. FIG. 12 is the cross-sectional photograph image of a region A of FIG. 10 and a region B of FIG. 11. The major-diameter direction of each of the capsules 38 is along (is substantially parallel to) the circumferential direction Cr of the outer periphery 42 of the bend 41 (the outer periphery 47 of the apex portion 46).

Figure 13:
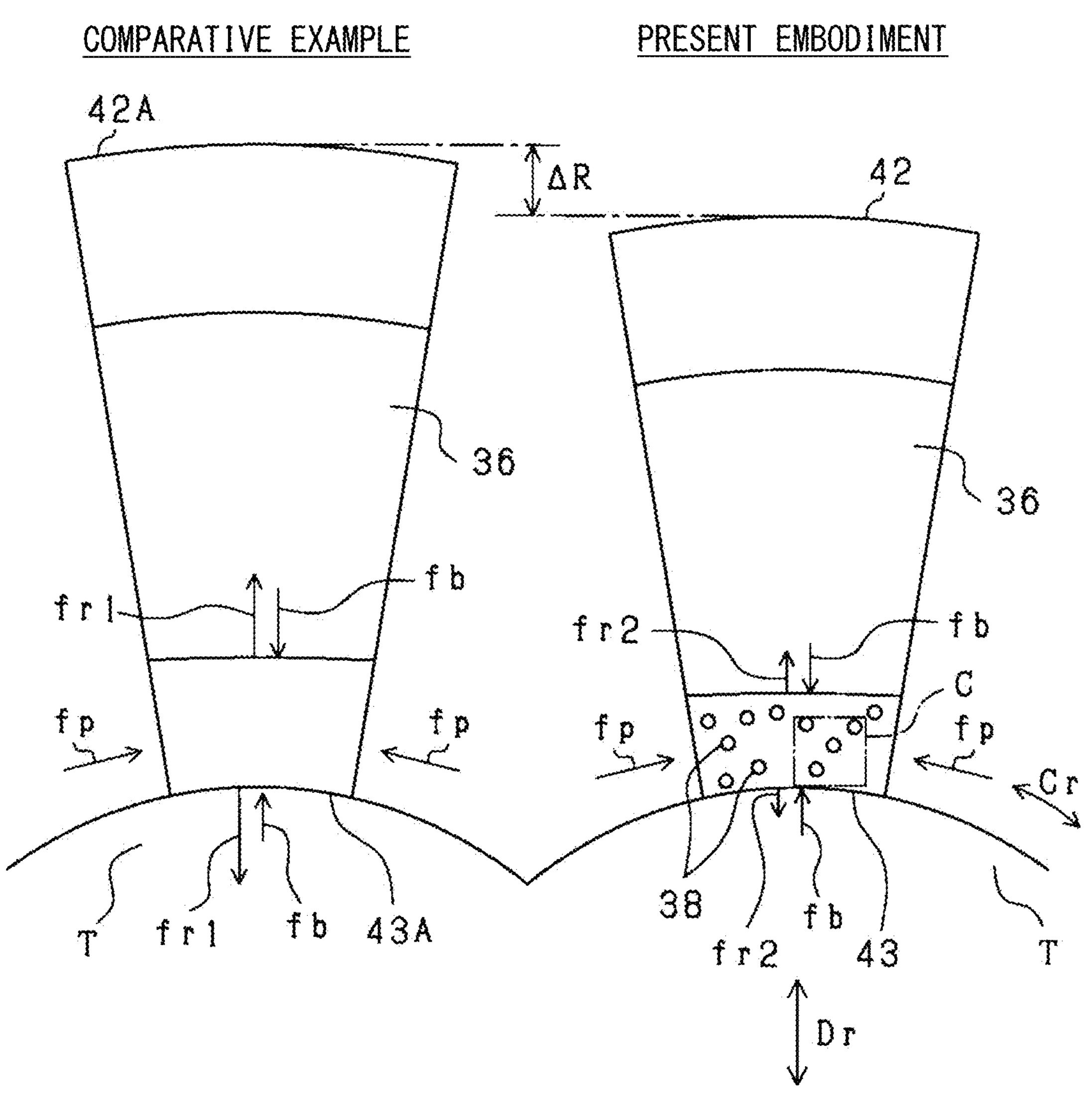
FIG. 13 is a schematic diagram showing a bend of a comparative example and a bend of the embodiment.

FIG. 13 is a schematic diagram showing a bend of a comparative example and the bend of the present embodiment. In FIG. 13, the indication of the capsules 38 located at the outer periphery 42 is omitted for the sake of simplicity. In the comparison example, at the time of bending the conductor segment 30 by using a jig T, a bending load fb and a compression load fp are applied to the inner periphery 43A, thereby generating a reaction force fr1. In the present embodiment, at the time of bending the conductor segment 30 by using the jig T, the bending load fb and the compression load fp are applied to the inner periphery 43, causing the capsules 38 to collapse, thereby releasing a gas contained inside of the capsules 38 to the outside of the electrical insulation film 35. Therefore, the reaction force fr2 is reduced relative to the reaction force fr1 of the comparative example, causing the inner periphery 43 to shrink in the radial direction Dr of the bend 41. Therefore, the position of the outer surface of the outer periphery 42 is displaced radially inwardly by a distance ΔR relative to the position of the outer surface of the outer periphery 42A of the comparative example. Furthermore, a volume of each corresponding capsule 38 located at the inner periphery 43 of the bend 41 becomes smaller than a volume of each corresponding capsule 38 located at the outer periphery 42 of the bend 41. In FIG. 13, the distance ΔR is exaggerated.

Figure 14:
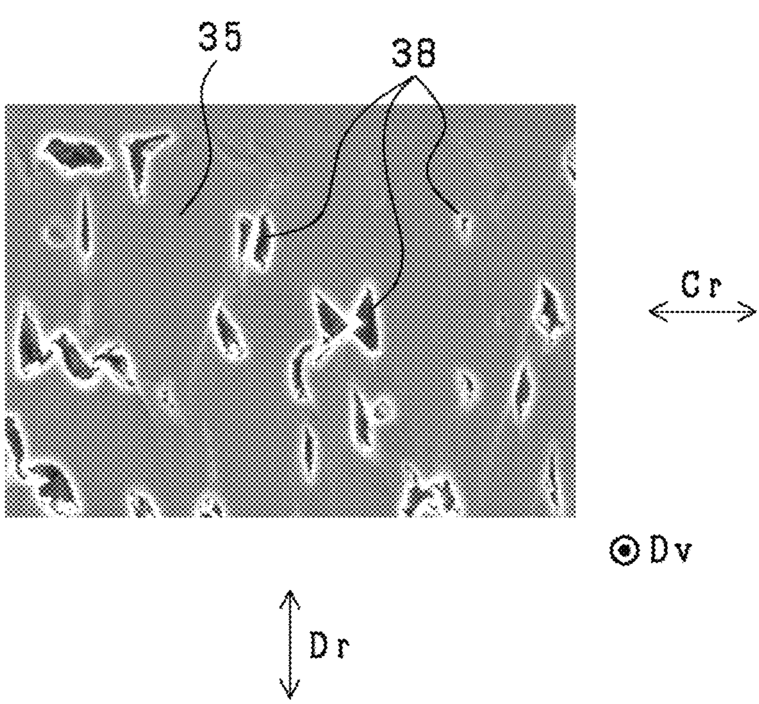
FIG. 14 is a cross-sectional photograph image showing capsules located at an inner periphery of a bend.

FIG. 14 is a cross-sectional photograph image showing the capsules 38 located at the inner periphery of the bend. FIG. 14 is the cross-sectional photograph image of a region C of FIG. 13. The major-diameter direction of each of these capsules 38 is along (is substantially parallel to) the direction perpendicular to the circumferential direction Cr of the inner periphery 43 of the bend 41 (the inner periphery 48 of the apex portion 46). The direction perpendicular to the circumferential direction Cr may be, for example, the radial direction Dr of the bend 41, the direction Dv perpendicular to the circumferential direction Cr, or a direction intermediate between the radial direction Dr and the direction Dv.

Figure 15:
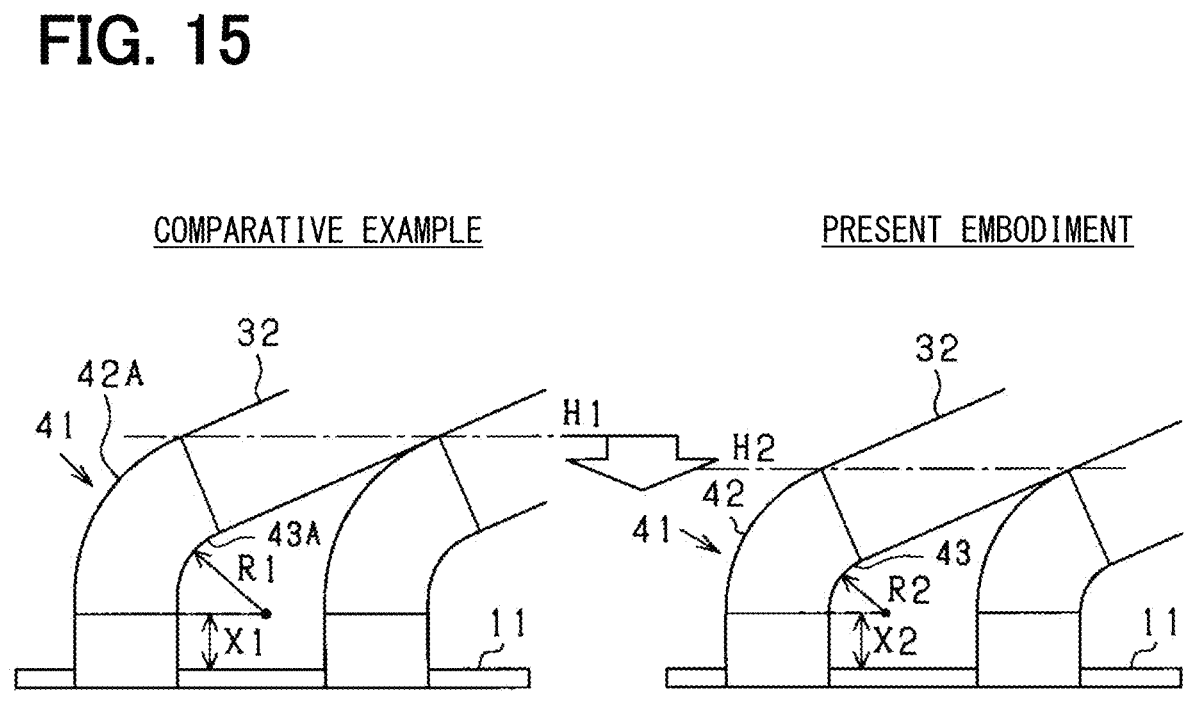

FIG. 15 is an enlarged view showing a radius of curvature of the bend 41 of a comparative example and a radius of curvature of the bend 41 of the present embodiment. A distance X2, which is measured from the surface of the stator core 11 to an end of the bend 41 (the outer periphery 42, the inner periphery 43) of the present embodiment, is the same as a distance X1, which is measured from the surface of the stator core 11 to an end of the bend 41 (the outer periphery 42A, the inner periphery 43A) of the comparison example. A radius of curvature R2 of the inner periphery 43 of the present embodiment is smaller than a radius of curvature R1 of the inner periphery 43A of the comparative example. Therefore, a height H2 of a starting point of the turn portion 32 of the present embodiment can be reduced in comparison to a height H1 of a starting point of the turn portion 32 of the comparative example.

Figure 16:
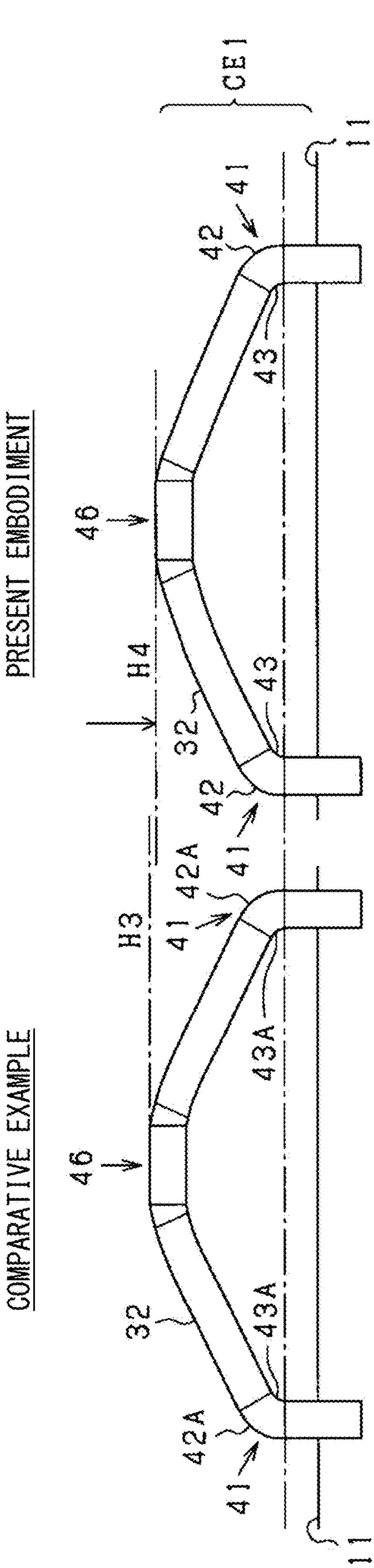
FIG. 16 is a front view showing a height of a coil end portion of the comparative example and a height of a coil end portion of the embodiment.

FIG. 16 is a front view showing a height of the coil end portion of the comparative example and a height of the coil end portion of the present embodiment. Because of the configuration shown in FIGS. 13 and 15, a height H4, which is measured from the surface of the stator core 11 to an upper surface of the apex portion 46 of the present embodiment, is lower than a height H3, which is measured from the surface of the stator core 11 to an upper surface of the apex portion 46 of the comparison example.

Figure 17:
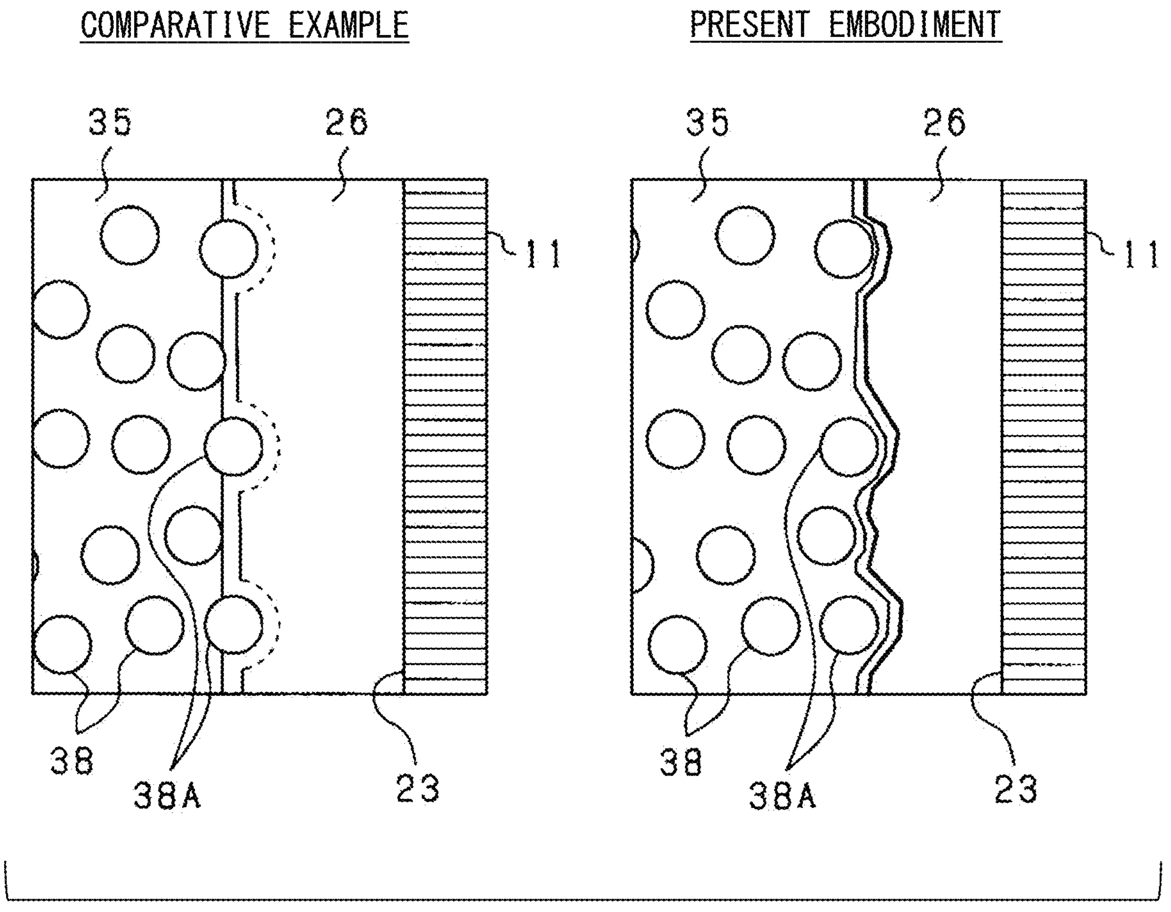
FIG. 17 is a schematic diagram showing a bonding state between a conductor segment and a stator core of a comparative example and a bonding state between the conductor segment and the stator core of the embodiment.

FIG. 17 is a schematic diagram showing a bonding state between the conductor segment 30 and the stator core 11 of the comparative example and a bonding state between the conductor segment 30 and the stator core 11 of the present embodiment. In the comparative example, the capsules 38A, which are located at the surface of the electrical insulation film 35, are not covered by the electrical insulation film 35. Therefore, the capsules 38A are in contact with the varnish 26. In the case where the capsules 38 (38A) are made of the silicone, the adhesiveness between the capsules 38A and the varnish 26 becomes weak, and thus the fixation of the conductor segment 30 by the varnish 26 to the stator core 11 at the inside of the slot 23 becomes weak. In contrast, in the present embodiment, the capsules 38A, which are located at the surface of the electrical insulation film 35, are covered by the electrical insulation film 35. The adhesiveness between the electrical insulation film 35, which is made of the polyimide, and the varnish 26, is relatively strong. Therefore, the conductor segment 30 can be strongly fixed to the stator core 11 by the varnish 26 at the inside of the slot 23.

This is also true for the portion 35*a* of the electrical insulation film 35 which is adjacent to the welded portion 34. Specifically, in the case where the capsules 38 (38A) are made of the silicone, the adhesiveness between the capsules 38A, which are located at the surface of the electrical insulation film 35, and the powder coating becomes weak. In the present embodiment, the capsules 38A, which are located at the surface of the electrical insulation film 35, are covered by the electrical insulation film 35. The adhesiveness between the electrical insulation film 35, which is made of the polyimide, and the film of powder coating, is relatively strong. Therefore, the degree of adhesion between the portion 35*a* of the electrical insulation film 35 and the film of powder coating can be improved.

In summary, the present embodiment described above provides the following advantages.

Each conductor segment 30 has the plurality of capsules 38 which are hollow and are dispersed inside the electrical insulation film 35. Thus, even if the crack 37 is generated in the electrical insulation film 35 at the outer periphery 42 of the bend 41 or the outer periphery 47 of the apex portion 46, the capsule(s) 38 can be stretched or torn in response to the crack 37 reaching the capsule(s) 38, and thereby the stress in the electrical insulation film 35 can be relieved. Thus, the propagation of the crack 37 generated at the electrical insulation film 35 can be limited. The capsules 38 located at the outer periphery 42 of the bend 41 and the outer periphery 47 of the apex portion 46 and the capsules 38 located at the inner periphery 43 of the bend 41 and the inner periphery 48 of the apex portion 46 are respectively shaped in the ellipsoid form. This allows the crack 37 in the electrical insulation film 35 to cross the capsule(s) 38 more easily than the spherical capsule(s) 38 of the same volume. Therefore, in comparison to the case where the spherical capsules 38 are dispersed inside the electrical insulation film 35 at the outer periphery 42, 47, it is possible to more effectively limit the propagation of the crack 37 in the electrical insulation film 35. As a result, the radius of curvature of each of the bend 41 and the apex portion 46 can be reduced, and thereby the height H4 of the coil end portion CE1 of the stator coil 12 can be limited, and thus the conduction loss of the stator coil 12 can be limited. It can also contribute to the size reduction of the stator 10 and thus the size reduction of the electric motor.

The direction of the major-diameter a (i.e., the major diameter direction) of each of the capsules 38 is along the corresponding one of the circumferential direction Cr of the outer periphery 42 of the bend 41 and the circumferential direction Cr of the outer periphery 47 of the apex portion 46. The configuration described above makes it easier for the crack 37 generated at the outer periphery 42 of the bend 41 or the outer periphery 47 of the apex portion 46 to cross the major diameter a of the capsule 38 at the time of propagating toward the radially inner side of the bend 41 or the apex portion 46. Thus, the propagation of the crack 37 generated at the outer periphery 42 of the bend 41 and the outer periphery 47 of the apex portion 46 can be limited.

The direction of the major-diameter a (i.e., the major diameter direction) of each of the capsules 38 located at the inner periphery 43 of the bend 41 and the inner periphery 48 of the apex portion 46 is along the direction perpendicular to the corresponding one of the circumferential direction Cr of the outer periphery 42 of the bend 41 and the circumferential direction Cr of the outer periphery 47 of the apex portion 46. According to the configuration described above, at the inner periphery 43 of the bend 41 and the inner periphery 48 of the apex portion 46, a minor diameter direction of each of the capsules 38 (i.e., a direction along which a minor diameter of the capsule 38 formed in the ellipsoid form is measured) is along the corresponding one of the circumferential direction Cr of the inner periphery 43 of the bend 41 and the circumferential direction Cr of the inner periphery 43 of the apex portion 46. Thus, at the inner periphery 43 of the bend 41 and the inner periphery 48 of the apex portion 46, the length of the capsule 38, which is measured in the circumferential direction Cr of the bend 41 or the apex portion 46, can be reduced, and thereby the radius of curvature of the bend 41 and the radius of curvature of the apex portion 46 can be further reduced easily.

The volume of each of the corresponding capsules 38 located at the inner periphery 43 of the bend 41 and the inner periphery 48 of the apex portion 46 becomes smaller than the volume of each of the corresponding capsules 38 located at the outer periphery 42 of the bend 41 and the outer periphery 47 of the apex portion 46. The configuration described above makes it easier for the crack 37 to cross the capsule(s) 38 at the outer periphery 42 of the bend 41 and the outer periphery 47 of the apex portion 46, and it is possible to further reduce the radius of curvature of the bend 41 at the inner periphery 43 of the bend 41 and the radius of curvature of the apex portion 46 at the inner periphery 48 of the apex portion 46. Furthermore, the configuration described above can be produced through stretching of the outer periphery 42 of the bend 41 and the outer periphery 47 of the apex portion 46 in the circumferential direction Cr and compressing of the inner periphery 43 of the bend 41 and the inner periphery 48 of the apex portion 46 in the circumferential direction Cr at the time of forming the bend 41 and the apex portion 46 at the conductor segment 30. Therefore, the configuration described above can be easily manufactured through the processing of the bend 41 and the apex portion 46.

The electrical insulation film 35 is made of the polyimide, and the conductor segment 30 is fixed to the stator core 11 by the varnish 26 at the inside of the slot 23. Since the adhesiveness between the polyimide and the varnish 26 is relatively strong, the conductor segment 30 can be stably fixed to the stator core 11 by the varnish 26 if the polyimide is in contact with the varnish 26. Here, the capsules 38A may possibly be located at the surface of the electrical insulation film 35. In such a case, if the adhesiveness between the capsules 38A and the varnish 26 is weak, the fixation of the conductor segment 30 by the varnish 26 to the stator core 11 may possibly be weakened. In this regard, the capsules 38A, which are located at the surface of the electrical insulation film 35, are covered by the electrical insulation film 35 (polyimide). Therefore, the conductor segment 30 can be stably fixed to the stator core 11 by the varnish 26.

The electrical insulation film 35 is made of the polyimide, and the welded portion 34 and the portion **35*a* of the electrical insulation film 35 adjacent to the welded portion 34 are powder coated. Since the adhesiveness between the polyimide and the powder coating is good, if the polyimide is in contact with the powder coating, the portion 35*a* of the electrical insulation film 35 adjacent to the welded portion 34 can be powder coated in a stable manner. Here, the capsules 38A may possibly be located at the surface of the electrical insulation film 35. In such a case, if the adhesiveness between the capsules 38A and the powder coating is weak, the degree of adhesion of the powder coating to the portion 35*a* of the electrical insulation film 35 adjacent to the welded portion 34 may possibly be weakened. In this regard, the capsules 38A, which are located at the surface of the electrical insulation film 35, are covered by the electrical insulation film 35 (polyimide). Therefore, the portion 35*a* of the electrical insulation film 35 adjacent to the welded portion 34** can be powder coated in a stable manner.

Each corresponding adjacent two conductor segments 30 have the one straight portions 31 inserted into the common slot 23 and the other straight portions 31 inserted into the two different slots 23, respectively. Therefore, in comparison to another configuration where the adjacent two conductor segments 30 have the one straight portions 31 inserted into the common slot 23 and the other straight portions 31 inserted into the common slot 23, the height of the coil end portion CE1 tends to become high to avoid interference between the conductor segments 30. In this regard, since the minimum value of the radius of curvature of the inner periphery 43 of the bend 41 is set to be equal to or smaller than 3.5 mm, the height H4 of the coil end portion CE1 can be limited. Furthermore, even in such a case, the capsules 38 described above can limit the further propagation of the crack 37 generated at the electrical insulation film 35.

At the time of bending the conductor segment 30 with the jig T, the capsules 38 located at the inner periphery 43 are crushed to reduce the reaction force fr2, and therefore it is possible to reduce the force required for the process of bending the conductor segment 30. In addition, it is possible to limit the occurrence of wrinkling of the electrical insulation film 35 at the inner periphery 43 of the bend 41 and the inner periphery 48 of the apex portion 46. Furthermore, the amount of return of the conductor segment 30 after bending the conductor segment 30 can be limited, and thereby the bending process of the conductor segment 30 is eased.

The embodiment described above may be modified as follows. The portions which are the same as those discussed in the above embodiment, will be indicated by the same reference signs.

Figure 18:
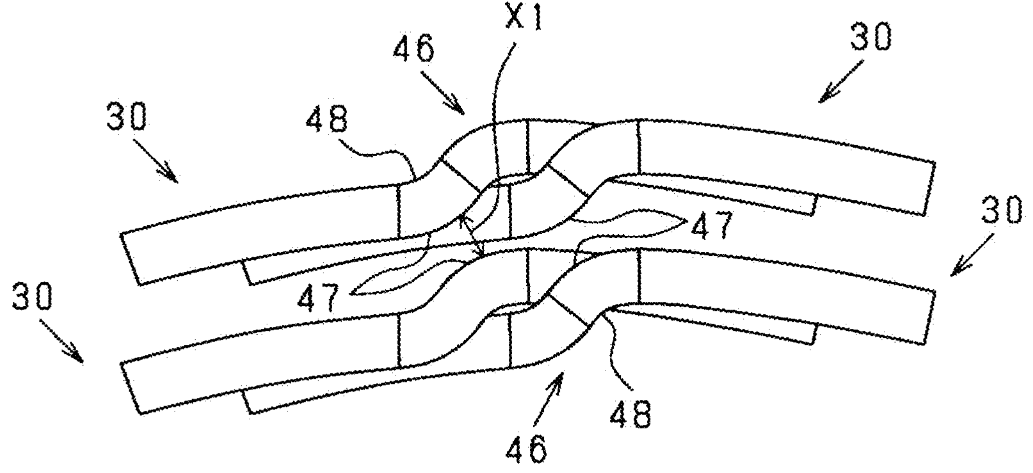
FIG. 18 is a plan view of conductor segments arranged in position.
Figure 19:
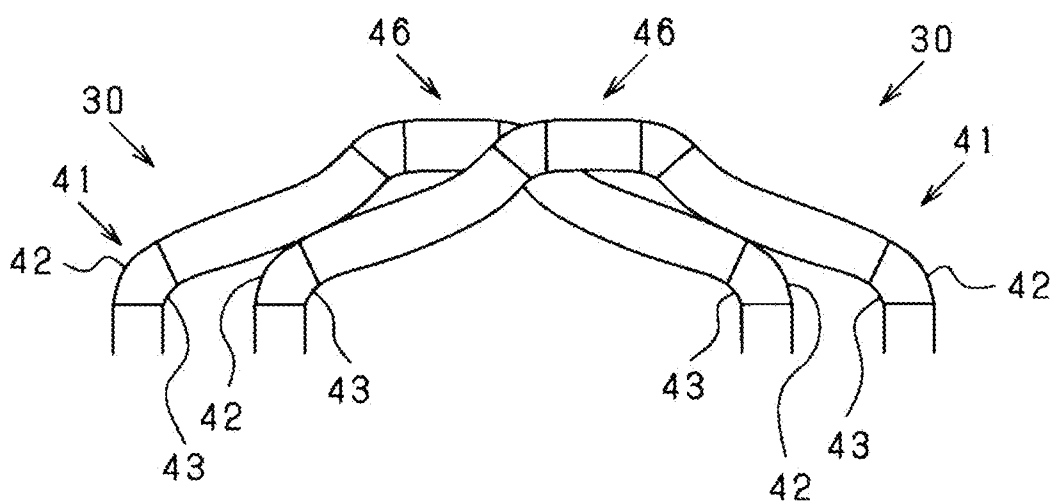
FIG. 19 is a front view of the conductor segments shown in FIG. 18.

As shown in a plan view of FIG. 18, at the outer periphery 47 of the bent portion of the apex portion 46 of the conductor segment 30, the electrical insulation film 35 (not shown) is stretched, making the electrical insulation film 35 thinner and also making the electrical insulation film 35 more susceptible to cracking. Therefore, the dielectric strength of the outer periphery 47 of the bent portion of the apex portion 46 of the conductor segment 30 is likely to decrease. FIG. 19 is a front view of the conductor segments 30 shown in FIG. 18.

In view of the above-mentioned point, as shown in the plan view of FIG. 18, a distance X1 between the outer periphery 47 of the bent portion of the apex portion 46 of one conductor segment 30 and the outer periphery 47 of the bent portion of the apex portion 46 of the adjacent conductor segment 30, which are adjacent to each other and are opposed to each other, is longer than one half of the thickness of the electrical conductor of one (or each) of these adjacent conductor segments 30. Preferably, the distance X1 is longer than two-thirds of the thickness of the electrical conductor of the conductor segment 30. That is, each of the plurality of conductor segments 30 has the bent portion (the apex portion 46) that is bent separately from the bend 41, and an outer periphery of the bent portion of each of the plurality of conductor segments 30 is out of contact with and is spaced from an adjacent one of the plurality of conductor segments, which is placed adjacent to the outer periphery of the bent portion, by the distance that is longer than one half of the thickness of the electrical conductor 36 of each of the plurality of conductor segments 30. In other words, on the outside of the outer periphery of the bent portion bent separately from the bend 41 of each conductor segment 30 described above, there is no other conductor segment 30 placed along (adjacent to) that conductor segment 30. The plurality of conductor segments 30 described above are formed (molded or shaped) one by one and are not formed (molded or shaped) together by bundling the conductor segments 30. In contrast, when the plurality of conductor segments are bundled and formed (molded or shaped), the conductor segments are adjacent to each other. Then, in such a case, on the outside of the outer periphery of the bent portion of each conductor segment, the other conductor segment is located along and in contact with (adjacent to) the outer periphery of this conductor segment, thereby reducing the dielectric strength of the outer periphery of the bent portion.

According to the configuration shown in FIG. 18, the insulation of the stator coil 12 can be further improved because it is easier to maintain the insulation distance between the outer periphery 47 of the bent portion of the apex portion 46 of the conductor segment 30 and the other conductor segment 30. Here, it should be noted that the outer periphery of the bent portion of the apex portion 46 of each of the plurality of conductor segments 30 may be spaced from the outer periphery of the bent portion of the adjacent one of the plurality of conductor segments 30 by the distance that is longer than the thickness of the electrical conductor of the conductor segment 30.

Inside each slot 23, the conductor segments 30 may be fixed to the stator core 11 using resin paint other than the varnish, or may be fixed to the stator core 11 by a foam resin sheet (electrical insulation sheet).

The electrical insulation film 35 may also be made of heat-resistant resin, which is other than the polyimide, such as PEEK (Poly Ether EtherKetone) resin, PPS (Poly Phenylene Sulfide) resin, or PAI (PolyAmide Imide) resin.

The rotary electric machine, to which the stator 10 is applied, may be a generator or an electric motor generator (MG: Motor Generator).

The above embodiments and modifications thereof may be combined within a possible extent that allows such a combination.

What is claimed is:

1. A stator for a rotary electric machine, comprising:
a stator core that is shaped in a tubular form and has a plurality of slots; and
a plurality of conductor segments that are inserted into the plurality of slots and are electrically connected with each other to form a stator coil, wherein:
each of the plurality of conductor segments has:
an electrical conductor that is shaped in a linear form;
an electrical insulation film that covers a periphery of the electrical conductor;
a plurality of capsules that are hollow and are dispersed inside the electrical insulation film; and
a bend that forms a bent-back shape on the conductor segment at an end portion of the stator core which faces in an axial direction; and
among the plurality of capsules, capsules located at an outer periphery of the bend and capsules located at an inner periphery of the bend are respectively shaped in an ellipsoid form at each of the plurality of conductor segments.

2. The stator according to claim 1, wherein at each of the plurality of conductor segments, a major-diameter direction of each of the capsules located at the outer periphery of the bend is along a circumferential direction of the outer periphery of the bend.

3. The stator according to claim 1, wherein at each of the plurality of conductor segments, a major-diameter direction of each of the capsules located at the inner periphery of the bend is along a direction perpendicular to a circumferential direction of the outer periphery of the bend.

4. The stator according to claim 1, wherein at each of the plurality of conductor segments, a volume of each of the capsules located at the inner periphery of the bend is smaller than a volume of each of the capsules located at the outer periphery of the bend.

5. The stator according to claim 1, wherein:
the electrical insulation film is made of polyimide at each of the plurality of conductor segments;
each of the plurality of conductor segments is fixed to the stator core by varnish at an inside of a corresponding one of the plurality of slots; and
among the plurality of capsules, capsules placed at a surface of the electrical insulation film are covered by the polyimide at each of the plurality of conductor segments.

6. The stator according to claim 1, wherein:
the electrical insulation film is made of polyimide at each of the plurality of conductor segments;
each of the plurality of conductor segments has an exposed portion of the electrical conductor, which is exposed from the electrical insulation film at an end portion of each of the plurality of conductor segments, and the exposed portions of each corresponding two of the plurality of conductor segments are welded together to form a welded portion;
the welded portion and an adjacent portion of the electrical insulation film, which is placed adjacent to the welded portion at each corresponding two of the plurality of conductor segments, are powder-coated; and
among the plurality of capsules, capsules placed at a surface of the electrical insulation film are covered by the polyimide at each of the plurality of conductor segments.

7. The stator according to claim 1, wherein:

one inserting portion of each of adjacent two of the plurality of conductor segments, which are placed adjacent to each other, is inserted into a common slot among the plurality of slots, and another inserting portion of one of the adjacent two of the plurality of conductor segments and another inserting portion of another one of the adjacent two of the plurality of conductor segments are inserted into two different slots, respectively, among the plurality of slots;

each of the plurality of conductor segments has an apex portion, which is bent separately from the bend;

a radius of curvature of the inner periphery of the bend is equal to or smaller than 3.5 mm; and a radius of curvature of an inner periphery of the apex portion is equal to or smaller than 2.0 mm.

8. The stator according to claim 1, wherein each of the plurality of conductor segments has a bent portion that is bent separately from the bend, and an outer periphery of the bent portion of each of the plurality of conductor segments is out of contact with and is spaced from an adjacent one of the plurality of conductor segments, which is placed adjacent to the outer periphery of the bent portion, by a distance that is longer than one half of a thickness of the electrical conductor of each of the plurality of conductor segments.

* * * * *